United States Patent [19]
Olsson

[11] 3,767,162
[45] Oct. 23, 1973

[54] RESILIENT CONNECTION BETWEEN STEM AND PLUG OF PLUG VALVE

[75] Inventor: Sven Willy Olsson, Linkoping, Sweden

[73] Assignee: Saab-Scania Aktiebolag, Linkoping, Sweden

[22] Filed: Sept. 8, 1972

[21] Appl. No.: 287,572

[30] Foreign Application Priority Data
Sept. 17, 1971 Sweden............................ 11774/71

[52] U.S. Cl........................ 251/84, 251/85, 251/86, 251/175, 251/192, 251/309
[51] Int. Cl............................................. F16k 5/14
[58] Field of Search .................... 251/84, 85, 86, 87, 251/175, 192, 309, 310, 311, 312

[56] References Cited
UNITED STATES PATENTS
2,573,177  10/1951  Bohler ............................ 251/309 X
3,192,945  7/1965  Blakeley .......................... 251/84 X
3,372,901  3/1968  Manor et al. ..................... 251/315
3,484,079  12/1969  Reagan ............................ 251/309

Primary Examiner—Alan Cohan
Assistant Examiner—Gerald A. Michalsky
Attorney—Ira Milton Jones

[57] ABSTRACT

The plug of a plug valve is connected with its stem by means of a connector comprising a collarlike part snugly embracing and anchored to the inner end of the stem and a resilient plate-like part extending laterally outwardly from the collar-like part, with outer edge portions secured to the plug. The plate-like part flexes to enable the plug to swing relative to the stem, but constrains the plug to partake of all stem rotation.

8 Claims, 6 Drawing Figures

Patented Oct. 23, 1973

RESILIENT CONNECTION BETWEEN STEM AND PLUG OF PLUG VALVE

This invention relates to valves having rotatable valve elements, such as ball plug valves, and the invention is more particularly concerned with means providing a driving connection between the valve element of a plug valve and the stem by which the valve element is adjustingly rotated.

A valve of the type to which the invention relates has a body that defines a pair of aligned but axially spaced apart passage portions and has a rotatable valve element or plug in its body, between the passage portions. The plug has its exterior formed as a surface of revolution (cylinder or sphere), and it has a passage through it which extends transversely to its rotational axis and which aligns with the passage portions in the body, to communicate them with one another, when the plug is in an open position of rotation. By means of a stem coaxially connected with the plug and accessible at the exterior of the body, the plug can be rotated to and from a closed position in which its passage is transverse to the body passage portions and it blocks communication between those passage portions. The plug can also be adjustingly rotated to any of a range of intermediate positions.

In such a valve it is often essential that the plug be constrained to partake of all rotation of the stem, without any play between the plug and the stem, in order to allow the valve to be precisely adjusted for desired flow conditions that it maintains in one of the intermediate positions of the plug. Nevertheless, it is very desirable that the plug have a floating connection with the stem whereby the plug is free for a small amount of motion in directions transverse to its rotational axis. Such floating of the plug enables fluid pressure to force it into intimate engagement with an annular seal customarily present in the valve body around the inner end of at least one of the passage portions therein, thus assuring that there will be no leakage through the valve when the plug is in its closed position. A floating connection between the plug and the stem also accommodates any out-of-roundness of the plug and any thermal expansion or contraction of it relative to the valve body. The need to compensate for geometrical inaccuracies in the plug is important because the plug can hardly be made perfectly concentric to its rotational axis without sacrificing production volume and cost.

One expedient heretofore used to enable the plug to float or swing relative to the stem has been to form the inner end portion of the stem with a noncircular (usually square) cross section to serve as a driver engaged in a correspondingly shaped hole in the plug. To the extent that such a connection allowed the plug to float in directions transverse to its rotational axis, it also permitted a certain amount of rotational play between the stem and the plug so that the plug could not be precisely adjusted to maintain exactly a desired flow rate in an intermediate position. Such play could be particularly troublesome where the stem was connected with a servo of an automatic control apparatus.

Another principle sometimes employed was to attach the stem rigidly to the plug and journal the stem in a bushing of short axial length that allowed the stem to swing slightly in following floating movements of the plug. While eliminating rotational play between the stem and the plug, this arrangement had the serious disadvantage of permitting nonrotational relative movement between the stem and the stuffing box through which it extended, greatly complicating the problem of achieving and maintaining a leakproof stuffing box, especially since the short axial length of the stuffing box provided little area for a seal between it and the stem.

Another expedient heretofore used has been to provide what were in effect two coaxial stems, both rigidly attached to the plug and one of which was intended merely to steady the plug and thus confine it against motion transverse to its rotational axis. Yielding sealing means in the valve body engaged the plug and resiliently accommodated its dimensional peculiarities. Obviously such a construction required that extremely close tolerances be maintained with respect to concentricity of the stems, the bushings for them and the plug, since any eccentricity subjected all seals to high forces and markedly interfered with smooth rotation of the valve element.

By contrast with these prior expedients it is an object of the present invention to provide a plug valve having its rotatable valve element or plug so secured to the stem by which the same is rotated that the plug is constrained to partake of all rotation of the stem but is nevertheless free for limited floating movement in directions transverse to its rotational axis, and wherein such floating movement of the plug is independent of the stem so that no unduly high forces in any direction are imposed upon the stem in consequence of such floating movement of the plug.

It is also an object of this invention to provide a simple and relatively inexpensive connection between the rotatable valve element of a plug valve and the stem by which the same is adjustingly rotated, which connection constrains the plug to partake of all rotation of the stem but allows the plug to have limited freedom to swing relative to the stem in directions transverse to its axis.

It will be apparent that the invention has as its ultimate object the provision of an improved plug valve which is relatively low in cost and easy to manufacture but which is nevertheless characterized by smooth valve element motion and a capability for very precise adjustment to establish and maintain a desired flow condition.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Referring now to the accompanying drawings, the numeral 5 designates generally the more or less tubular body of a plug valve embodying the principles of this invention. The valve body has an enlarged diameter medial portion that defines a valve chamber 6, and it also defines a pair of coaxial passage portions 7 that extend in opposite directions from the valve chamber. The outer ends of the valve body are not shown, since it is well known that the passage portions continue outwardly to ports at its ends, and that the end portions of the body are formed for connection with duct means.

Figure 3:
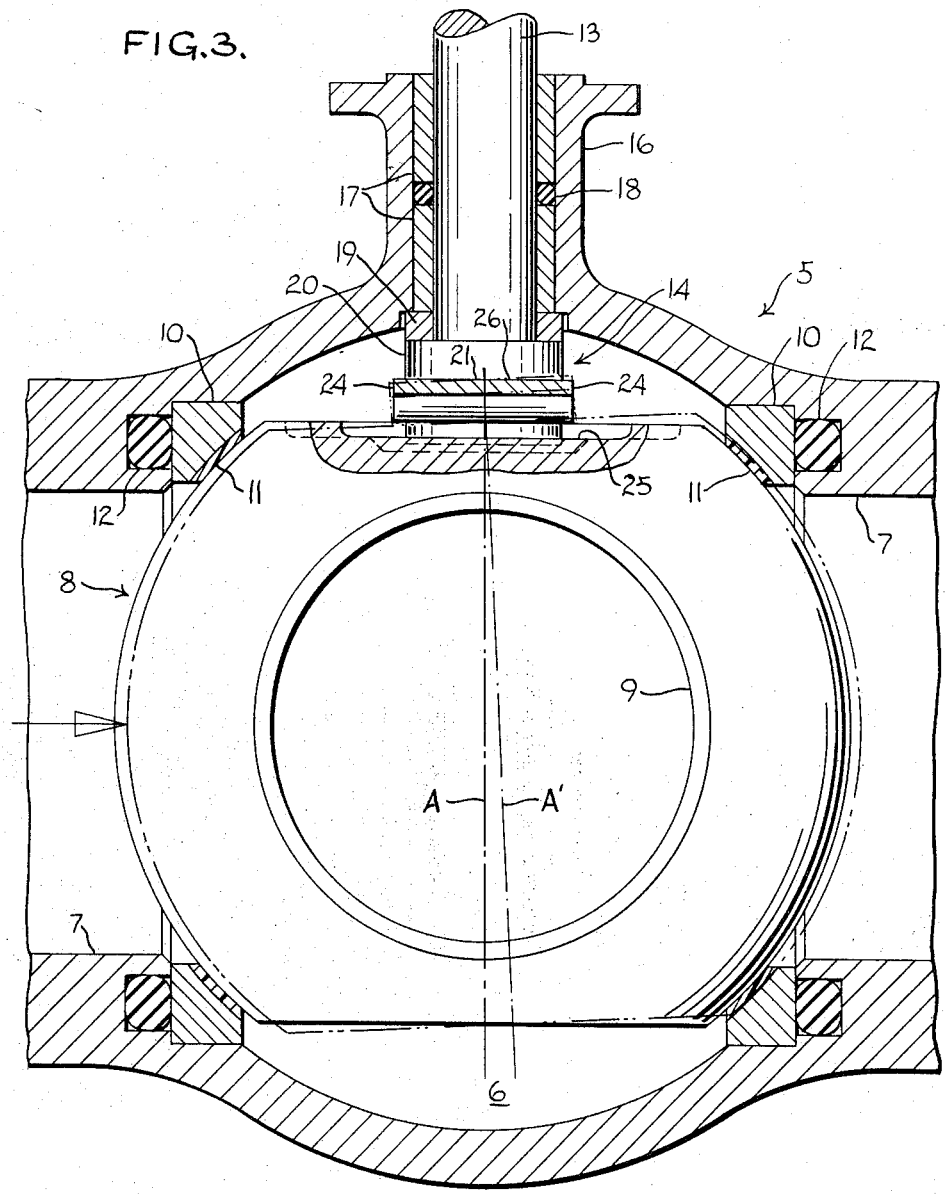
FIG. 3 is a view generally similar to FIG. 2 but showing the valve in fully closed position and with a portion of the plug and its connection to the stem shown in section on the plane of the line 3—3 in FIG. 2.

In the valve chamber 6 there is a plug or valve element 8 for controlling flow of fluid through the valve, having its exterior formed as a surface of revolution. In the present case the plug is illustrated as having a spherical external surface, but it will be understood that it could be cylindrical. The plug has a passage 9 through it, transverse to its axis of rotation, which aligns with the body passage portions 7 in the fully open position of the plug and thus communicates those passage portions with one another. The plug is rotatable about its axis through a range of intermediate positions to a fully closed position in which the plug passage 9 is transverse to the body passage portions 7 and said passage portions are blocked by spherical side surfaces on the valve element, as illustrated in FIG. 3.

In the valve body there are sealing rings 10 that engage the plug around the inner end of each passage portion 7 and provide seats for the valve element. These rings are received in annular grooves in the valve body, concentric to the passage portions 7, one at each side of the valve chamber and opening inwardly thereto. Each sealing ring can have a sealing surface layer 11 that engages the spherical external surface of the valve element to minimize friction as the plug rotates in contact with the sealing ring and to resist abrasion due to the edges that are defined on the plug by the passage 9 therethrough. If the valve must be completely fluid tight at low fluid pressures, each of the sealing rings 10 can be backed by a resilient ring 12 that is confined in the valve body under axial compression to maintain an inward force upon its sealing ring that holds it in snug sealing engagement with the plug, allowing the valve to be economically manufactured with a clearance between the external surface of the plug and the valve body proper.

Adjusting rotation is imparted to the plug by means of a stem 13 that has an inner end portion which is connected with the plug by means of a connector 14 of this invention and has an outer end portion 15 which is accessible at the exterior of the valve body for connection with a suitable manual or mechanical actuator (not shown).

The valve body has a conventional bonnet 16 that projects up from its valve chamber portion and comprises a stuffing box in which the stem is rotatably journaled. A bushing in the bonnet is provided by a pair of axially spaced sleeves 17 of Teflon or the like, with a resilient O-ring 18 confined between them and radially compressed between the stem and the tubular wall of the bonnet to afford a seal around the stem. A collar or running ring 19 at the underside of the bonnet, which can likewise be of Teflon, receives axially outward thrust forces acting on the stem. Since the stem is not subjected to large radial load forces, owing to the connector 14, the above described journaling of the stem has good resistance to wear and maintains its seal for a long time.

The connector 14 of this invention comprises a collar-like central part 20, which embraces the inner end portion of the stem and is securely anchored thereto, and a resilient, more or less diaphragm-like or plate-like part 21 which extends laterally in opposite directions from the stem, is relatively thin in the directions of the stem axis, and has outer edge portions firmly secured to the plug, as by weldments 22.

More specifically, the connector 14 can be formed in one piece, as by precision steel casting, with its plate-like part 21 integral with its collar-like central portion. To provide a secure anchorage of the connector to the stem, the collar part 20 has an inside diameter to snugly receive the inner end portion of the stem therein, and two wedge-like keys 23, received in longitudinal grooves 15 in the collar and the stem, constrain the connector to partake of all rotation of the stem. To secure the stem against axial displacement, a roll pin 15′ or the like is driven through collar, stem and keys.

Figure 1:
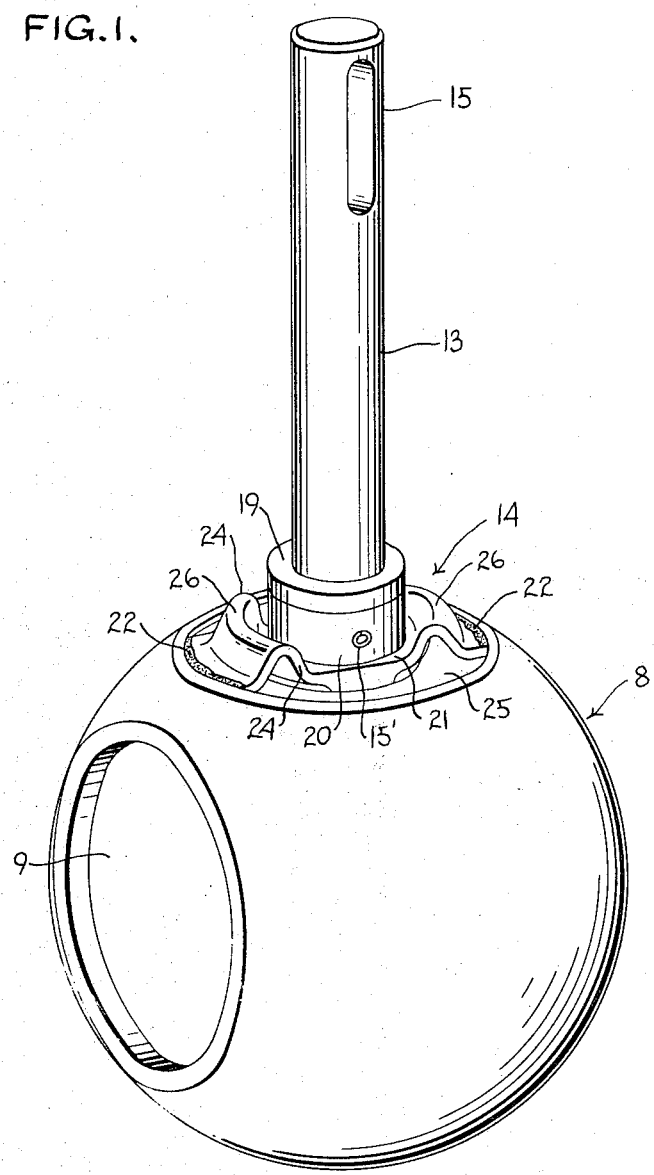
FIG. 1 is a perspective view of the stem and the rotatable valve element of a ball plug valve, with a connection between them that embodies the principles of this invention.

The plate-like part of the connector, as perhaps best seen in FIG. 1, could be circular but is preferably rectangular in plan view, with longer straight side edges 24 that are parallel to one another and are spaced small distances to opposite sides of the collar part. The shorter edges of the rectangle, instead of being straight, can be curved to conform to the circumferential surface of a shallow coaxial well 25 in the plug, to enable the shorter edge portions to be securely welded to that surface of the well. The well 25 in the plug allows the plate-like part to be spaced from the surface of the plug all along the lengths of the edges 24, thus assuring the desired flexibility of the plate-like part. To further insure flexibility, the plate-like part can have substantially deep corrugations 26 which extend generally transversely to its longer edges but which are preferably arcuate in planform and concentric to the collar part, as shown in FIG. 1.

It will be seen that the plate-like part of the connector does not deform under torsion about its axis and therefore transmits all rotation of the stem to the plug, allowing no rotational play between them. However, by reason of its resilience, it allows the plug to have limited swinging motion relative to the stem, flexing to elastically change its form under forces that tend to produce such swinging. The center of flexure for this swinging movement is near the center of the connector 14, as appears from FIG. 3, where movement of the plug to the right, under the influence of fluid pressure exerted on its left hand side, tends to swing the plug so that its rotational axis A is in the position denoted by the line A′, the movement of the plug being of course exaggerated in the figure. Such swinging of the plug in response to fluid pressure of course forces the plug into very firm sealing engagement with the annular seal or seat 10 at its downstream side.

Preferably the longer edges 24 of the rectangular plate-like part of the connector extend parallel to the passage 9 through the plug; and since the plate-like part is secured to the plug only along its shorter edges, the connection between the plug and the stem is substantially stiffer in the directions parallel to said passage 9 than in the transverse directions. Hence when the plug is in its closed position of rotation it is most susceptible to the force of pressure fluid upon it, but as it is rotated towards its open position the connector 14 offers more and more resistance to swinging of the plug in response to forces in the direction of the fluid stream through the valve body. As a result, fluid pressure still tends to maintain the plug engaged with the downstream seal 10 when the plug is in any of its intermediate positions of rotation, but as the need for a good seal between the plug and the seat decreases with opening of the valve, the force which the plug exerts against that seat diminishes, thereby making for easier adjusting rotation of the plug and minimizing wear between the plug and the seat.

In that portion of its range of positions in which the plug position is not substantially affected by the pressure drop across it, the flexi-bility of the connection accommodates slight out-of-roundness of the plug (such form errors being difficult to avoid in practical production) and also accommodates any thermal expansion or contraction of the plug relative to other portions of the valve. It will be apparent too, that because of the resilience of the connector 14, the floating movements of the plug in directions transverse to the stem axis do not result in substantial radial forces upon the stem that would jeopardize its seal or its rotational freedom.

Figure 2:
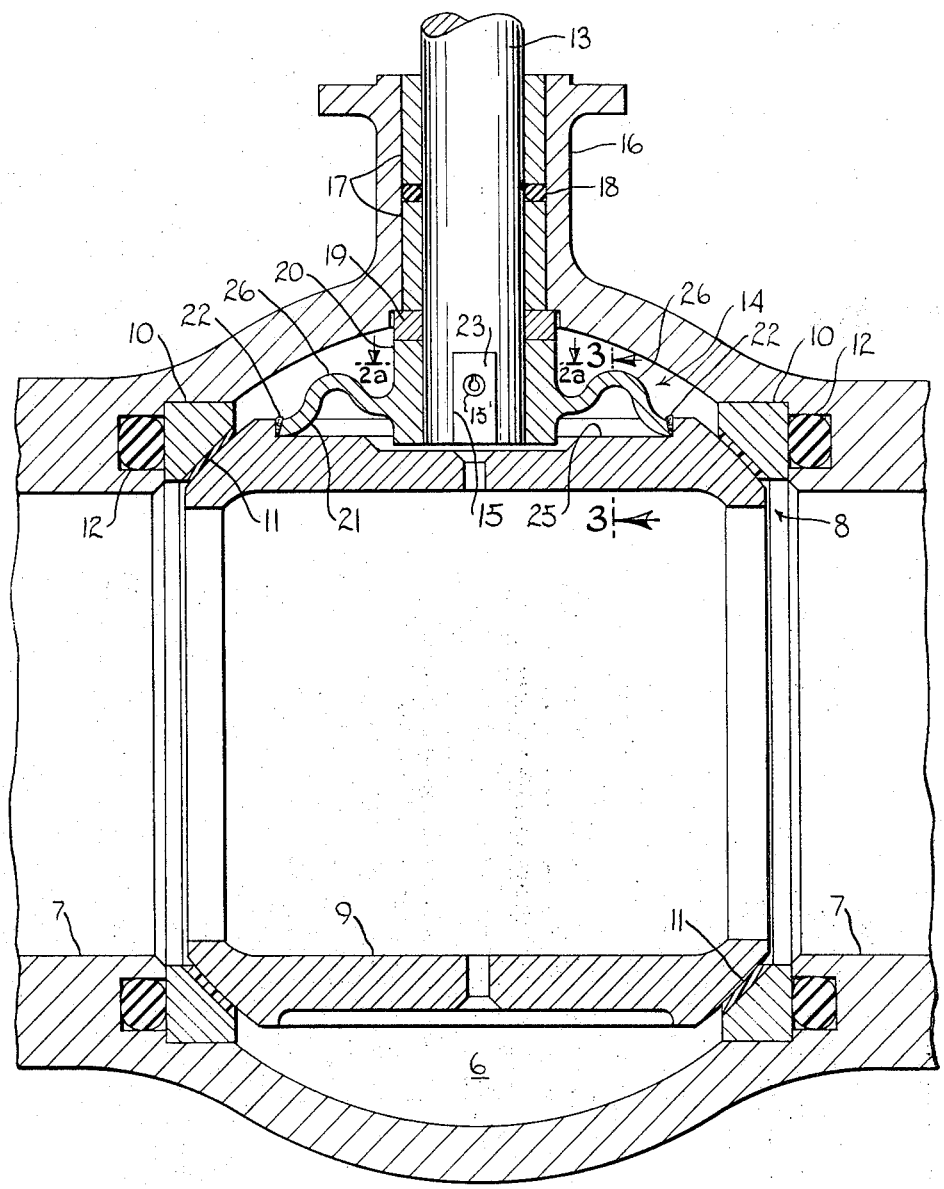
FIG. 2 is a longitudinal sectional view through a valve embodying the structure illustrated in FIG. 1, the valve being shown in its fully open condition.
Figure 2A:
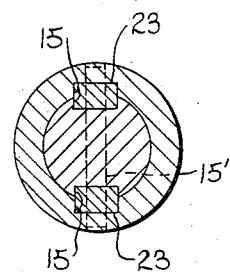
FIG. 2a is a fragmentary sectional view taken on the plane of the line 2a–2a in FIG. 2.
Figure 4:
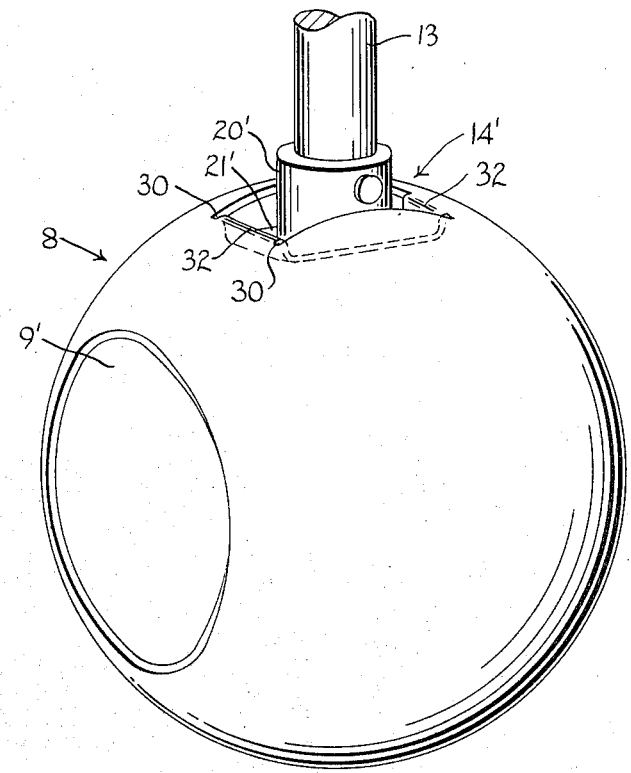
FIG. 4 is a view generally similar to FIG. 1 but illustrating a modified embodiment of the invention in a ball plug formed from sheet metal.
Figure 5:
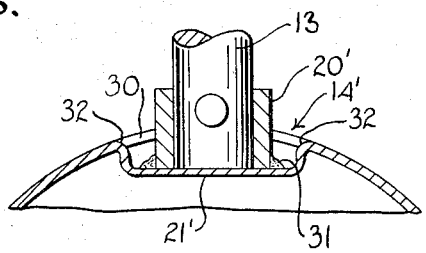
FIG. 5 is a fragmentary longitudinal sectional view through the connection between the plug and its stem in the embodiment of the invention illustrated in FIG. 4.

In the embodiment of the invention illustrated in FIGS. 1–3 the plug is illustrated as a substantially solid body having the passage 9 bored therethrough. In the modified embodiment of FIGS. 4 and 5, by contrast, the plug is formed from sheet metal, to have a substantially spherical external surface and coaxial holes opening to its hollow interior to define the passage 9' through it. In this case the plate-like resilient portion of the connector 14' is formed as an integral part of the plug, being defined from the remainder of the plug by parallel slits 30 therein that extend in the direction of the passage axis. The collar part 20' is formed separately from the plate-like part 21' and is secured to the latter as by a weldment 31. The plate-like part 21' of course has its end portions integrally connected with the remainder of the plug, as at 32, and adjacent to those connections the end portions are bent radially inwardly to provide the effect of corrugations which enhance its flexibility. It will be understood that the sheet metal plug will have a relatively small wall thickness and that the slits which define the platelike part will be sufficiently long to assure that the plate-like part has adequate flexibility.

From the foregoing description taken with the accompanying drawings it will be apparent that this invention provides a resilient connection between the rotatable valve element of a plug valve and the stem by which that valve element can be adjustingly rotated, which connection allows the valve element to swingingly float relative to the stem in directions transverse to the stem axis and thus allows the valve element to be maintained in good engagement with its seat in response to fluid pressure and in spite of any irregularities in the shape of the plug element, all without imposing undue radial forces upon the stem.

Those skilled in the art will appreciate that the invention can be embodied in forms other than as herein disclosed for purposes of illustration.

The invention is defined by the following claims:

1. A connector that transmits to the rotatable element of a plug valve the rotary movements of a coaxial stem by which said valve element can be adjustingly actuated, which connector is characterized by:

a member which is anchored to the stem and which extends laterally in opposite directions therefrom, portions of said member that are laterally spaced from the stem and at opposite sides thereof being anchored to the valve element, said member having substantial area normal to the stem axis so as to be substantially undeformed by torsional forces about said axis, and thus constraining the valve element to partake of all rotation of the stem, but being thin in the direction of said axis and resilient so as to be elastically deformable to permit the valve element to swing relative to the stem in directions transverse to said axis.

2. A connector that transmits to the rotatable valve element of a plug valve the rotary movements of a coaxial stem by which said valve element can be adjustingly actuated, said connector comprising:

A. a plate-like member that is resiliently deformable in directions transverse to its thickness but is rigid in directions generally parallel to its surfaces;

B. means on the central portion of the plate-like member by which the same is anchored to the stem with its surfaces generally radial to the stem; and C. means anchoring to the valve element opposite edge portions of the plate-like member which are spaced from the stem at equal distances to opposite sides thereof so that the valve element is constrained to partake of all rotation of the stem but by reason of the resilient deformability of said member can swing relative to the stem in directions transverse to the stem axis.

3. The connector of claim 2, further characterized by:

said means on the central portion of the plate-like member comprising a collar-like part closely embracing the stem and secured thereto.

4. The connector of claim 3 wherein:

1. said collar-like part is formed integrally with the plate-like member; and 2. said means anchoring said opposite edge portions of the plate-like member to the valve element comprise weldments.

5. The connector of claim 4 wherein:

3. said plate-like member is substantially rectangular with longer edges spaced to opposite sides of said collar-like part and extending lengthwise parallel to a passage through the valve element; and 4. the shorter edge portions of the plate-like member are received in a shallow well in the valve element and are contiguous to the circumferential surface thereof, said weldments extending along the shorter edges.

6. The connector of claim 3 wherein the valve element is made of sheet metal and has opposite holes therein which define a passage therethrough, further characterized by:

1. said plate-like member being integral with the valve element and being defined therefrom by slits spaced to opposite sides of the rotational axis of the valve element and extending lengthwise parallel to said passage; and
2. a weldment securing said collar-like part to the central portion of the plate-like member.

7. The connector of claim 2 wherein said plate-like member has corrugations that extend substantially concentrically to the stem axis.

8. The connector of claim 2 wherein said plate-like member is substantially rectangular, with longer edges spaced to opposite sides of the stem and extending lengthwise parallel to a passage through the valve element, and with shorter edges comprising said opposite edge portions which are anchored to the valve element.

* * * * *